(12) United States Patent
McDonald et al.

(10) Patent No.: US 8,770,014 B2
(45) Date of Patent: Jul. 8, 2014

(54) SYSTEM FOR DETECTING HYDRAULIC FLUID LEAKS

(75) Inventors: Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 1161 days.

(21) Appl. No.: 11/685,718

(22) Filed: Mar. 13, 2007

(65) Prior Publication Data
US 2008/0223111 A1 Sep. 18, 2008

(51) Int. Cl.
*G01M 3/04* (2006.01)
(52) U.S. Cl.
USPC ............................................................ 73/49.7
(58) Field of Classification Search
USPC ............................................. 701/31; 73/49.7
See application file for complete search history.

(56) References Cited

U.S. PATENT DOCUMENTS

| | | | |
|---|---|---|---|
| 5,221,125 A * | 6/1993 | Okochi et al. ................... 303/10 |
| 5,795,995 A | 8/1998 | Shimaoka et al. |
| 5,974,865 A | 11/1999 | Dambach |
| 6,132,012 A * | 10/2000 | Ishii ......................... 303/122.12 |
| 6,142,212 A * | 11/2000 | Scholz et al. .................. 164/452 |
| 6,470,247 B1 * | 10/2002 | Meyer et al. .................. 701/33.6 |
| 2004/0183369 A1 * | 9/2004 | Soga ........................... 303/113.4 |
| 2005/0257768 A1 * | 11/2005 | McDonald et al. ........ 123/198 F |
| 2007/0028877 A1 | 2/2007 | McDonald et al. |

FOREIGN PATENT DOCUMENTS

| | | |
|---|---|---|
| CN | 1573071 A | 2/2005 |
| DE | 19513158 A1 | 10/1996 |
| DE | 19711875 A1 | 10/1997 |

* cited by examiner

*Primary Examiner* — Hezron E Williams
*Assistant Examiner* — Nathaniel Kolb (57) ABSTRACT

A control system and method for detecting a hydraulic system leak in an engine includes a pressure sensor that senses a first pressure reading of a hydraulic fluid supply at a first time and a second pressure reading of said hydraulic fluid supply at a second time. A comparison module calculates a pressure ratio based on the first and second pressure readings and signals a fault condition based on a relationship between the pressure ratio and a pressure threshold.

11 Claims, 6 Drawing Sheets

SYSTEM FOR DETECTING HYDRAULIC FLUID LEAKS

FIELD OF THE INVENTION

The present disclosure relates to internal combustion engines, and more particularly to engine control systems that detect hydraulic fluid leaks in hydraulic systems.

BACKGROUND OF THE INVENTION

Some internal combustion engines include engine control systems that deactivate cylinders under specific low load operating conditions. For example, an eight cylinder engine can be operated using four cylinders to improve fuel economy by reducing pumping losses. This process is generally referred to as active fuel management (AFM). Operation using all of the engine cylinders is referred to as an "activated" mode. Conversely, operation using less than all of the cylinders of the engine (i.e. one or more cylinders are not active) is referred to as a "deactivated" mode.

In the deactivated mode, there are fewer firing cylinders. As a result, there is less drive torque available to drive the vehicle driveline and accessories (e.g., alternator, coolant pump, A/C compressor). However, engine efficiency is increased as a result of decreased air pumping losses due to the deactivated cylinders not taking in and compressing fresh intake air.

A lifter oil manifold assembly (LOMA) is implemented to activate and deactivate select cylinders of the engine. The LOMA includes a series of solenoids associated with corresponding cylinders. The solenoids are selectively energized to enable hydraulic fluid flow to the lifters to inhibit valve lifter operation, thereby deactivating the corresponding cylinders.

The LOMA can experience significant oil leakage caused by faulty assemblies, hydraulic solenoid valves, and/or LOMA gaskets. Hydraulic leaks can slow the dynamic response of the LOMA subsystems and cause engine damage due to mistimed AFM valve lifter events.

SUMMARY

A control system and method for detecting a hydraulic system leak in an engine includes a pressure sensor that senses a first pressure reading of a hydraulic fluid supply at a first time and a second pressure reading of said hydraulic fluid supply at a second time. A comparison module calculates a pressure ratio based on the first and second pressure readings and signals a fault condition based on a relationship between the pressure ratio and a pressure threshold.

In other features, a pressure reading module determines the first pressure reading before a mode change of the engine and determines the second pressure reading after the mode change of the engine. The comparison module signals the fault condition when the pressure ratio one of falls below the pressure threshold the comparison module stores said fault condition as a fault code.

In other features, a filtering module removes high frequency content from the first pressure reading and the second pressure reading. A pressure reading module determines the first pressure reading before an active fuel management event of the engine and determines the second pressure reading after the active fuel management event of the engine. The active fuel management event includes deactivating a set of cylinders of the engine. A pressure reading module determines the first pressure reading before actuating a valve of the engine and determines the second pressure reading after actuating the valve of the engine.

A control system for detecting a hydraulic system leak in an engine includes a pressure sensor that senses pressure of a hydraulic fluid supply, a pressure reading that determines a first pressure reading of the hydraulic fluid supply at a first time and a second pressure reading of the hydraulic fluid supply at a second time, and a comparison module that calculates a pressure ratio based on the first and second pressure readings and that signals a fault condition based on a relationship between the pressure ratio and a pressure ratio threshold.

In other features, the comparison module signals the fault condition when the pressure ratio falls below the pressure threshold and rises above the pressure threshold. The reading module determines the first pressure reading before actuating a valve of the engine and determines the second pressure reading after actuating the valve of the engine. The pressure reading module determines the first pressure reading before an active fuel management event of the engine and determines the second pressure reading after the active fuel management event of the engine.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
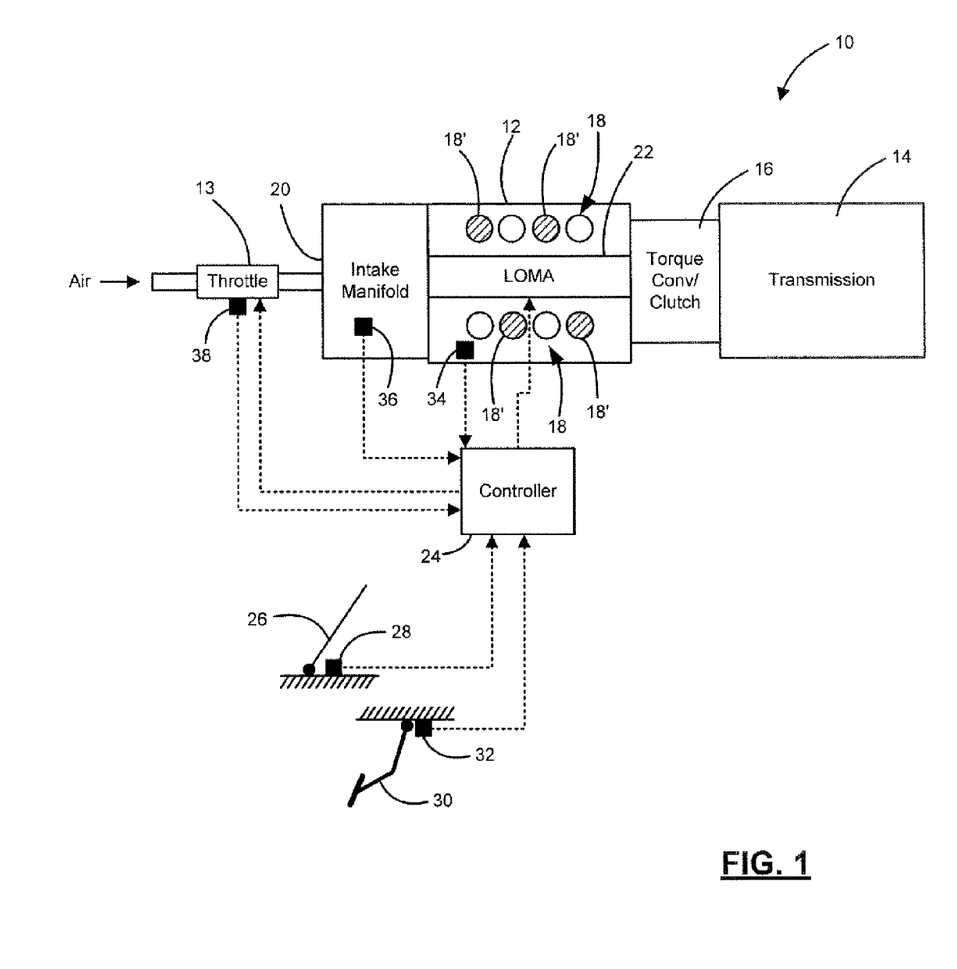
FIG. 1 is a functional block diagram illustrating a vehicle powertrain including an active fuel management (AFM) engine control system according to the present invention.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more select cylinders 18' may be selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine also includes a lifter oil manifold assembly (LOMA) 22 that deactivates the select cylinders 18', as described in further detail below.

A controller 24 communicates with the engine 12 and various inputs and sensors as discussed herein. A vehicle operator manipulates an accelerator pedal 26 to regulate the throttle 13. More particularly, a pedal position sensor 28 generates a pedal position signal that is communicated to the controller 24. The controller 24 generates a throttle control signal based on the pedal position signal. A throttle actuator (not shown) adjusts the throttle 13 based on the throttle control signal to regulate air flow into the engine 12.

The vehicle operator manipulates a brake pedal 30 to regulate vehicle braking. More particularly, a brake position sensor 32 generates a brake pedal position signal that is communicated to the controller 24. The controller 24 generates a brake control signal based on the brake pedal position signal. A brake system (not shown) adjusts vehicle braking based on the brake control signal to regulate vehicle speed. An engine speed sensor 34 generates a signal based on engine speed. An intake manifold absolute pressure (MAP) sensor 36 generates a signal based on a pressure of the intake manifold 20. A throttle position sensor (TPS) 38 generates a signal based on throttle position.

When the engine 12 enters an operating point to enable the deactivated mode, the controller 24 transitions the engine 12 to the deactivated mode. In an exemplary embodiment, N/2 cylinders 18' (i.e. half of the cylinders N) are deactivated, although any number of cylinders may be deactivated. Upon deactivation of the select cylinders 18', the controller 24 increases the power output of the remaining or activated cylinders 18. Inlet and exhaust ports (not shown) of the deactivated cylinders 18' are closed to reduce pumping losses.

The engine load is determined based on the intake MAP, cylinder mode and engine speed. More particularly, if the MAP is below a threshold level for a given engine revolutions per minute (RPM), the engine load is deemed light and the engine 12 could possibly be operated in the deactivated mode. If the MAP is above the threshold level for the given RPM, the engine load is deemed heavy and the engine 12 is operated in the activated mode. The controller 24 controls the LOMA 22 based on the solenoid control, as discussed in further detail below.

Figure 2:
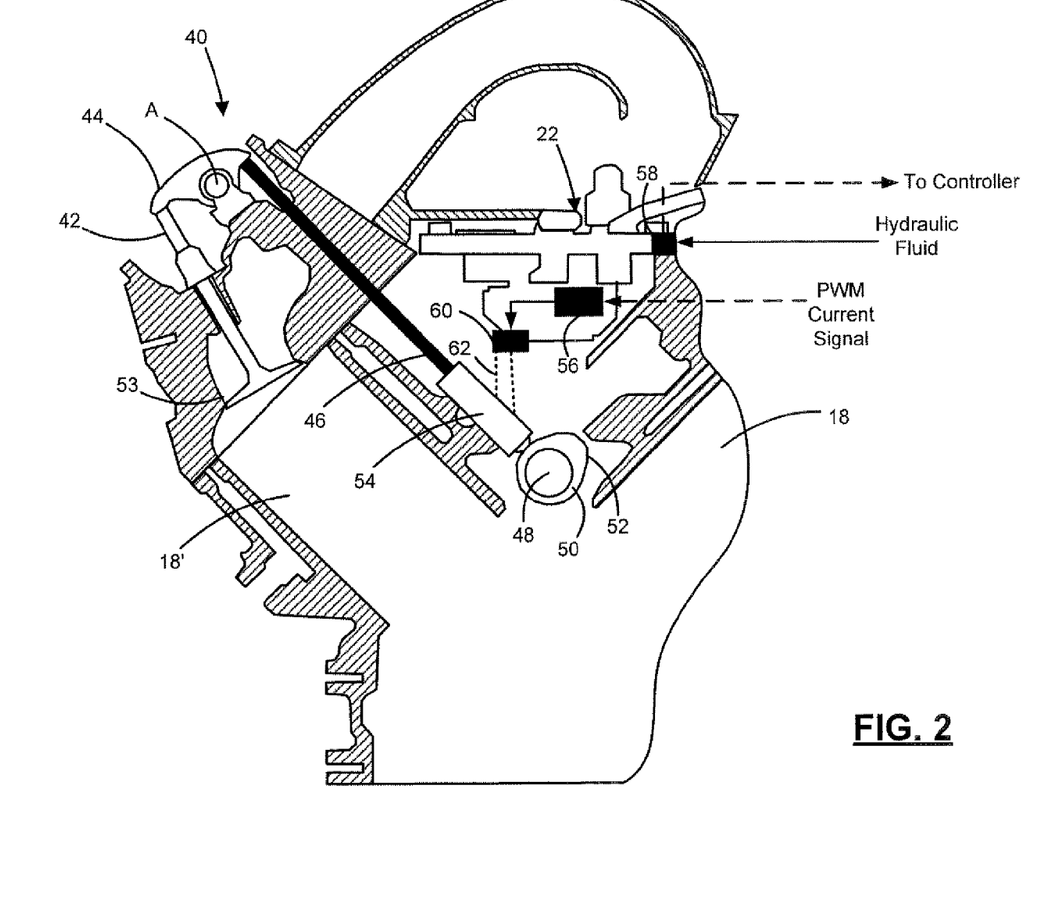
FIG. 2 is a partial cross-sectional view of the AFM engine illustrating a lifter oil manifold assembly (LOMA) and an intake valvetrain.

Referring now to FIG. 2, an intake valvetrain 40 of the engine 12 includes an intake valve 42, a rocker 44 and a pushrod 46 associated with each cylinder 18. The engine 12 includes a rotatably driven camshaft 48 having a plurality of valve cams 50 disposed therealong. A cam surface 52 of the valve cams 50 engage the lifters 54 to cyclically open and close intake ports 53 within which the intake valves 42 are positioned. The intake valve 42 is biased to a closed position by a biasing member (not shown) such as a spring. As a result, the biasing force is transferred through the rocker 44 to the pushrod 46, and from the pushrod 46 to the lifter 54, causing the lifter 54 to press against the cam surface 52.

As the camshaft 48 is caused to rotate, the valve cam 50 induces linear motion of the corresponding lifter 54. The lifter 54 induces linear motion in the corresponding pushrod 46. As the pushrod 46 is induced to move outward, the rocker 44 is caused to pivot about an axis (A). Pivoting of the rocker 44 induces movement of the intake valve 42 toward an open position, thereby opening the intake port 53. The biasing force induces the intake valve 42 to the closed position as the camshaft 48 continues to rotate. In this manner, the intake port 53 is cyclically opened to enable air intake.

Although the intake valvetrain 40 of the engine 12 is illustrated in FIG. 2, it is appreciated that the engine 12 also includes an exhaust valvetrain (not shown) that operates in a similar manner. More specifically, the exhaust valvetrain includes an exhaust valve, a rocker and a pushrod associated with each cylinder 18. Rotation of the camshaft 48 induces reciprocal motion of the exhaust valves to open and close associated exhaust ports, as similarly described above for the intake valvetrain.

The LOMA 22 provides pressurized fluid to a plurality of lifters 54 and includes solenoids 56 (shown schematically) associated with select cylinders 18' as shown in FIG. 1. The select cylinders 18' are those that are deactivated when operating the engine 12 in the deactivated mode. The lifters 54 are disposed within the intake and exhaust valvetrains to provide an interface between the cams 50 and the pushrods 46. In general, there are two lifters 54 provided for each select cylinder 18' (one lifter for the intake valve 42 and one lifter for the exhaust valve). It is anticipated, however, that more lifters 54 can be associated with each select cylinder 18' (i.e., multiple inlet or exhaust valves per cylinder 18'). The LOMA 22 further requires a pressure sensor 58 that generates a pressure signal indicating a pressure of a hydraulic fluid supply to the LOMA 22. It is anticipated that one or more pressure sensors 58 can be implemented.

Each lifter 54 associated with the select cylinders 18' is hydraulically actuated between first and second modes. The first and second modes respectively correspond to the activated and deactivated modes. In the first mode, the lifter 54 provides a mechanical connection between the cam 50 and the pushrod 46. In this manner, the cam 50 induces linear motion of the lifter 54, which is transferred to the pushrod 46. In the second mode, the lifter 54 functions as a buffer to provide a mechanical disconnect between the cam 50 and the pushrod 46. Although the cam 50 induces linear motion of the lifter 54, the linear motion is not transferred to the pushrod 46.

The solenoids 56 selectively enable hydraulic fluid flow to the lifters 54 to switch the lifters 54 between the first and second modes. Although there is generally one solenoid 56 associated with each select cylinder 18' (i.e., one solenoid for two lifters), it is anticipated that more or fewer solenoids 56 can be implemented. Each solenoid 56 actuates an associated valve 60 (shown schematically) between open and closed positions. In the closed position, the valve 60 inhibits pressurized hydraulic fluid flow to the corresponding lifters 54. In the open position, the valve 60 enables pressurized fluid flow to the corresponding lifters 54 via a fluid passage 62. The pressurized hydraulic fluid flow is provided to the LOMA 22 from a pressurized hydraulic fluid source.

Although not illustrated, a brief description of an exemplary solenoid is provided herein to provide a better understanding of the present invention. The solenoids 56 generally include an electromagnetic coil and a plunger that is disposed coaxially within the coil. The plunger provides a mechanical interface between the solenoid 56 and a mechanical element, such as the valve 60. The plunger is biased to a first position relative to the coil by a biasing force. The biasing force can be imparted by a biasing member, such as a spring, or by a pressurized fluid. The solenoid 56 is energized by supplying current to the coil, which induces magnetic force along the coil axis. The magnetic force induces linear movement of the plunger to a second position. In the first position, the plunger holds the valve 60 in its closed position to inhibit pressurized hydraulic fluid flow to the corresponding lifters. In the second position, the plunger actuates the valve 60 to its open position to enable pressurized hydraulic fluid flow to the corresponding lifters.

The detection control system of the present invention determines the occurrence of a hydraulic system leak at or downstream of the LOMA solenoid(s). In an exemplary embodiment, the hydraulic system leak can occur at, but is not limited, a LOMA gasket (not shown). More specifically, the detection control system of the present invention determines that a hydraulic system leak has occurred based on pressure readings of the LOMA hydraulic fluid supply preceding and following a commanded active fuel management (AFM) event (i.e. deactivation of select cylinders 18'). It is anticipated, however that the current invention can be implemented to detect leaks in other hydraulic systems in which hydraulic fluid flow restrictions remain substantially constant over the operation of the system.

In various embodiments, the fluid pressure sensor 58 can be positioned in other fixed engine fluid passages or galleries including, but not limited to, a hydraulic lash adjuster fluid gallery (not shown). Additionally, in various embodiments, rather than sensing pressure readings prior to and after an AFM event, pressure readings can be taken before and after switching among other various operating modes (i.e. changing actuation modes of a valve). For example, such embodiments include, but are not limited to, two-step variable valve actuation systems.

Figure 3:
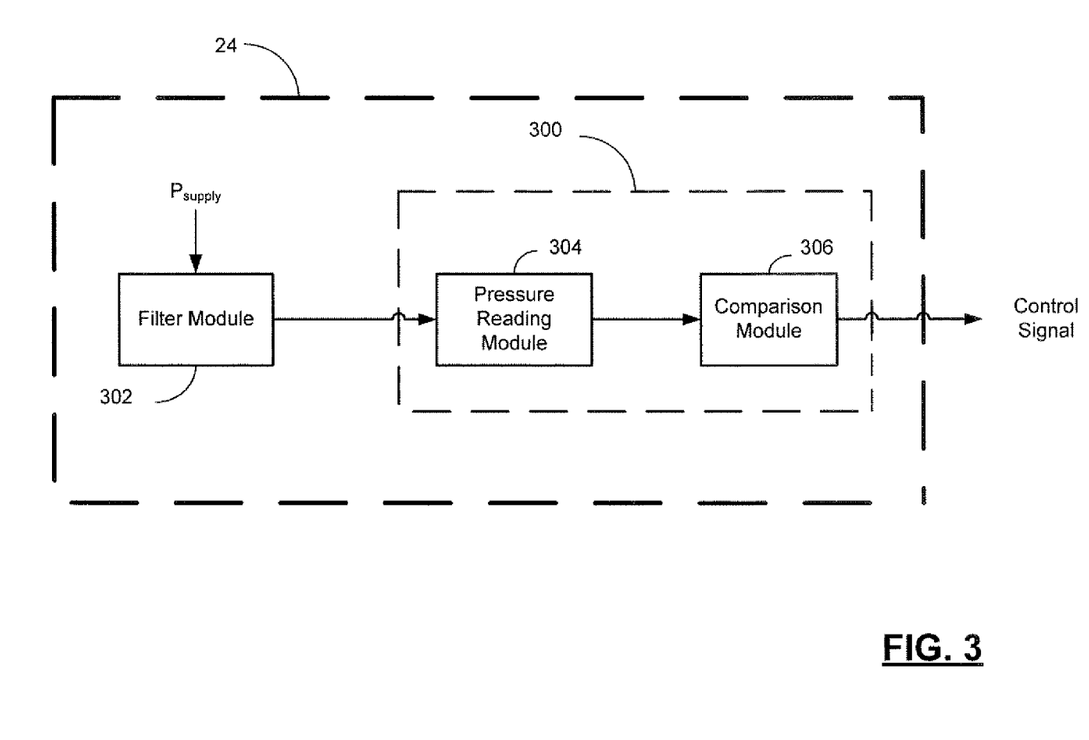
FIG. 3 is a functional block diagram illustrating an exemplary module that executes the leak detection control system of the present invention.

Referring now to FIG. 3, the controller 24 includes a filter module 302 that receives as inputs, hydraulic fluid pressure signals ($P_{supply}$) provided by the pressure sensor 58. The filter module 302 contains low pass filtering components to remove high frequency content of the $P_{supply}$ signal.

The leak detection system 300 includes a pressure reading module 304 that determines a first pressure reading of the hydraulic fluid supplied to the LOMA 22 prior to an AFM valve 62 opening event and a second pressure reading after the AFM valve 62 opening event. In the present implementation, the pressure reading module 304 determines the first pressure reading before the controller 24 energizes the LOMA solenoid(s). The pressure reading module 304 determines the second pressure reading after a period of time after the first pressure reading in which all commanded cylinders 18' should be deactivated, and the pressure of the hydraulic fluid supplied to the LOMA 22 should have recovered to substantially the same pressure as before the controller 24 switched the solenoid 56. A comparison module 306 calculates a pressure ratio of the second pressure reading to the first pressure reading. The comparison module 306 then compares the calculated pressure ratio to a pressure threshold. If the pressure ratio is below the pressure threshold, the comparison module 306 generates a fault control signal indicating that a hydraulic system leak exists at and/or downstream of the valve 62.

Figure 4:
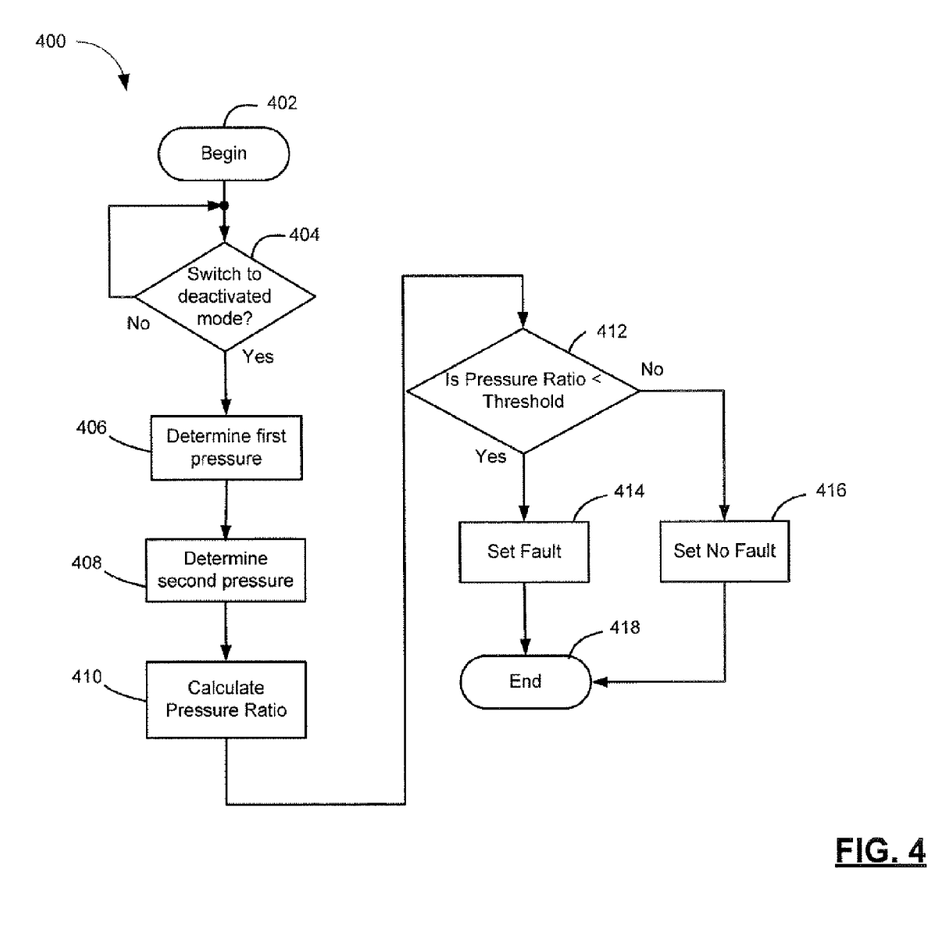
FIG. 4 is a flowchart illustrating the leak detection control system of the present invention.

Referring now to FIG. 4 a method 400 for determining the presence of a hydraulic system leak in the leak detection system 300 will be described in more detail. Control begins the method 400 at step 402. In step 404, control determines whether to switch the solenoid 56 (i.e., from the de-energized state to the energized state) which will switch the engine 12 to the deactivated mode. If the engine 12 is not to be switched, control returns to step 404. In step 406, control determines a first pressure reading of the hydraulic fluid supply before delivering the hydraulic fluid supply to the lifter 54.

In step 408, control determines a second pressure reading of the hydraulic fluid supply. In the present implementation, control waits a period of time before determining the second pressure reading. In step 410, control calculates a pressure ratio of the second pressure reading to the first pressure reading taken in step 406. In step 412, control determines whether the pressure ratio is less than a pressure threshold. If the pressure ratio is above or equal to the pressure threshold, control determines that no leak exists at the LOMA 22 and sets a no fault condition in step 416. If the pressure ratio is below the pressure threshold, control determines that a leak has been detected and sets a fault condition in step 414. The method 400 ends in step 418. In an exemplary embodiment, the conditions can be stored as a fault indicator code. Additionally, the fault indication code can be requested by a service technician during a diagnosis of the engine 12.

Figure 5A:
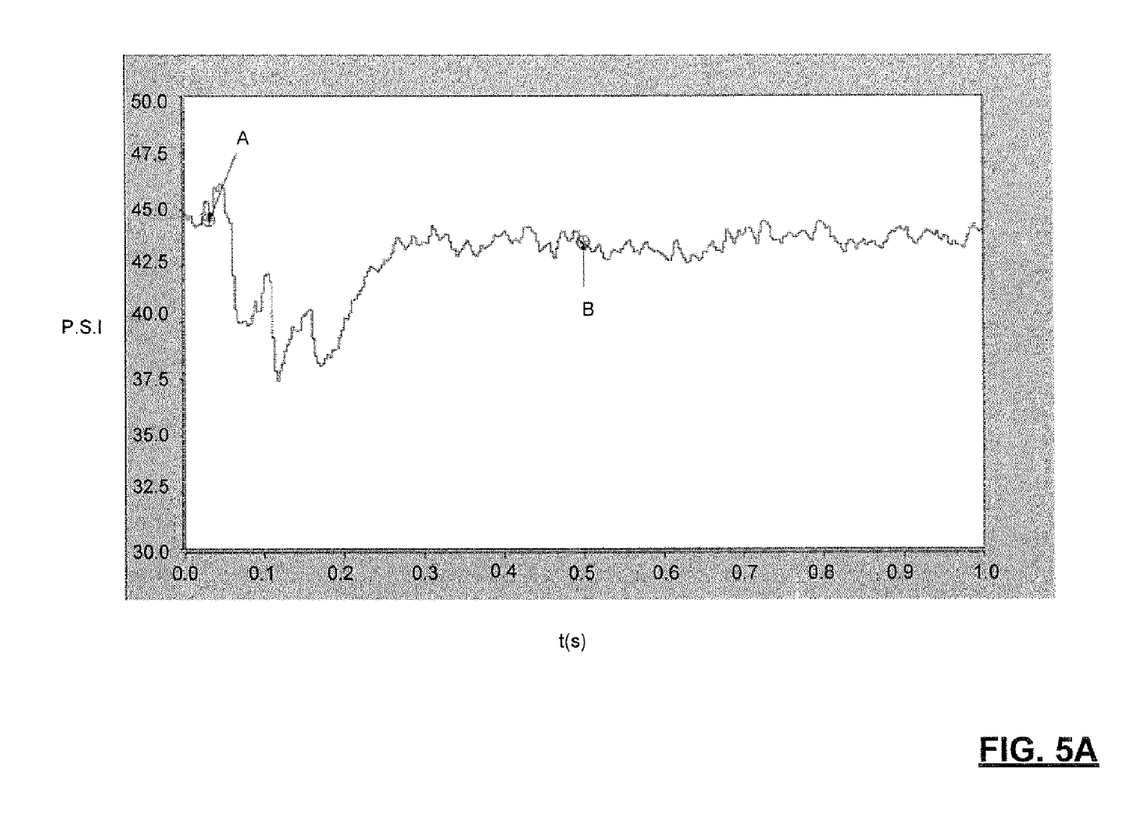
FIG. 5A is a graph illustrating an exemplary pressure reading signal generated according to the present invention.
Figure 5B:
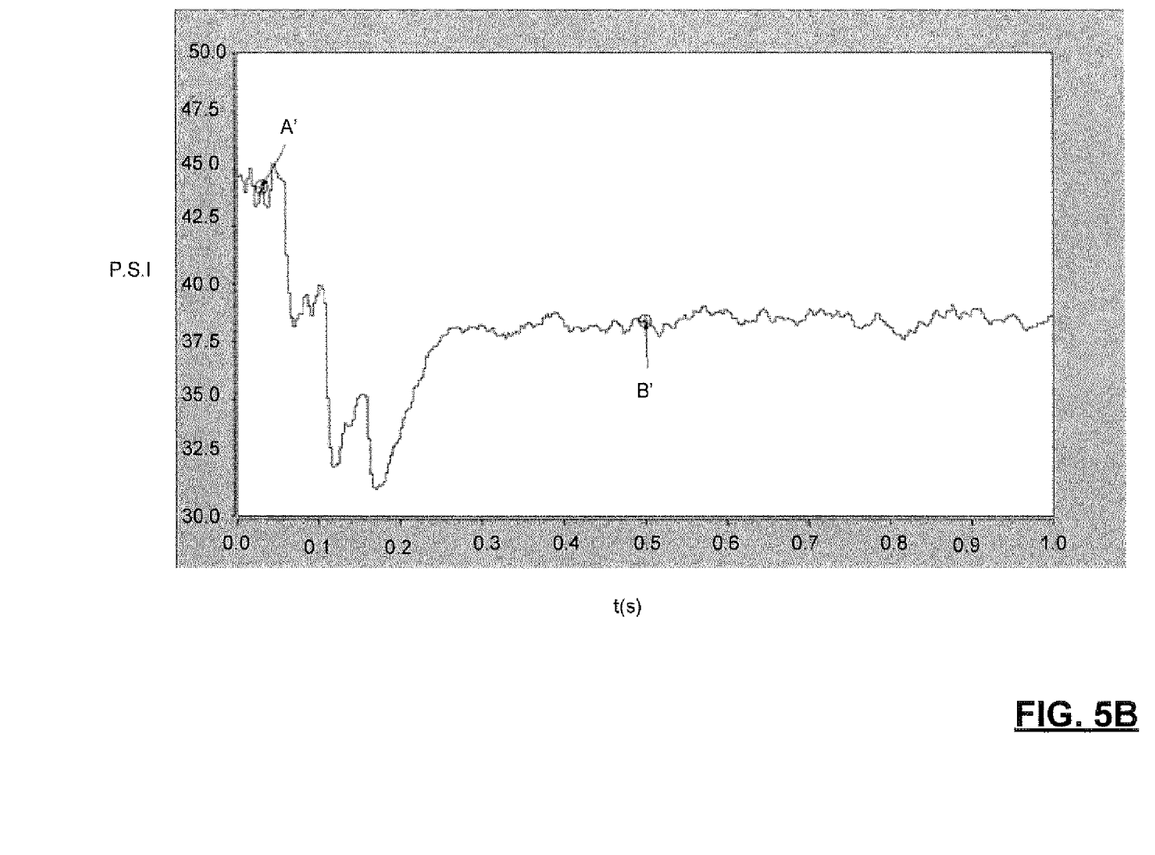
FIG. 5B is a graph illustrating an exemplary pressure reading signal generated according to the present invention.

Referring now to FIG. 5A and 5B, the pressure ratio of the second pressure reading relative to the first pressure reading is determined based on test data using an equivalent LOMA system. More specifically, the pressure readings of the hydraulic fluid supply are monitored over time. The horizontal axis represents time given in seconds and the vertical axis represents pressure given in pounds per square inch (PSI).

FIG. 5A and FIG. 5B illustrate simulations of the pressure readings of the hydraulic fluid supply provided to the LOMA 22 before and after the engine 12 is switched to deactivation mode. In FIG. 5A, point A is approximately equal to 44.5 PSI and point B is approximately equal to 43.5 PSI resulting in a pressure ratio of 0.978. In an exemplary embodiment, the pressure threshold could be set at 0.90. Since the pressure ratio exceeds the exemplary pressure threshold, the leak detection control system indicates that no hydraulic system leak has occurred. It should be appreciated that other values for the pressure threshold are anticipated.

FIG. 5B illustrates a simulation in which the leak detection control system of the present invention would signal a system leak. Point A' is approximately equal to 44.1 PSI and point B' is approximately equal to 38.4 PSI resulting in a pressure ratio of 0.870. The pressure ratio falls below exemplary pressure threshold indicating a hydraulic system leak within the LOMA 22.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for detecting a hydraulic system leak in a vehicle powertrain, comprising:

a filtering module that outputs filtered pressure values by filtering a pressure signal output by a pressure sensor to remove high frequency content from said pressure signal, wherein said pressure sensor senses pressures of a fluid within a gallery of a hydraulic system of said vehicle powertrain;

a pressure reading module that determines a first pressure reading based on a first one of said filtered pressure value output before a valve of said hydraulic system is actuated and that determines a second pressure reading based on a second one of said filtered pressure values output after said valve is actuated; and a comparison module that calculates a pressure ratio of said first and second pressure readings and that signals a fault condition indicative of said hydraulic system leak based on a relationship between said pressure ratio and a pressure threshold, wherein said valve controls an active fuel management event of an engine of said vehicle powertrain, said active fuel management event includes deactivating a set of cylinders of said engine, and said first one of said filtered pressure values is output before said active fuel management event and said second one of said filtered pressure values is output after said active fuel management event.

2. The control system of claim 1 wherein said pressure ratio is said second pressure reading divided by said first pressure reading and wherein said comparison module signals said fault condition when said pressure ratio falls below said pressure threshold.

3. The control system of claim 1 wherein said comparison module stores said fault condition as a fault code.

4. The control system of claim 1 wherein said pressures are sensed upstream of said valve.

5. A method for detecting a hydraulic system leak in a vehicle powertrain, comprising:

outputting filtered pressure values by filtering a pressure signal output by a pressure sensor to remove high frequency content from said pressure signal, wherein said pressure sensor senses pressures of a fluid within a gallery of a hydraulic system of said vehicle powertrain;

determining a first pressure reading based on a first one of said filtered pressure values output before a valve of said hydraulic system is actuated;

determining a second pressure reading based on a second one of said filtered pressure values output after said valve is actuated; and calculating a pressure ratio of said first and second pressure readings and signaling a fault condition indicative of said hydraulic system leak based on a relationship between said pressure ratio and a pressure threshold, wherein said valve controls an active fuel management event of an engine of said vehicle powertrain, said active fuel management event includes deactivating a set of cylinders of said engine, and said first one of said filtered pressure values is output before said active fuel management event and said second one of said filtered pressure values is output after said active fuel management event.

6. The method of claim 5 further comprising signaling said fault condition when said pressure ratio falls below said pressure threshold, wherein said pressure ratio is said second pressure reading divided by said first pressure reading.

7. The method of claim 5 wherein said fault condition is stored as a fault code.

8. The method of claim 5 wherein said pressures are sensed upstream of said valve.

9. A control system for detecting a hydraulic system leak in a vehicle powertrain, comprising:

a pressure sensor that senses pressures of a fluid within a gallery of a hydraulic system of said vehicle powertrain and outputs a pressure signal based on said pressures;

a filtering module that outputs filtered pressure values by filtering said pressure signal to remove high frequency content from said pressure signal;

a pressure reading module that determines a first pressure reading based on a first one of said filtered pressure values output before a valve of said hydraulic system is actuated and a second pressure reading based on a second one of said filtered pressure values output after said valve is actuated; and a comparison module that calculates a pressure ratio of said first and second pressure readings and that signals a fault condition of said hydraulic system leak based on a relationship between said pressure ratio and a pressure threshold, wherein said valve controls an active fuel management event of an engine of said vehicle powertrain, said active fuel management event includes deactivating a set of cylinders of said engine, and said first one of said filtered pressure values is output before said active fuel management event and said second one of said filtered pressure values is output after said active fuel management event.

10. The control system of claim 9 wherein said pressure ratio is said second pressure reading divided by said first pressure reading and wherein said comparison module signals said fault condition when said pressure ratio falls below said pressure threshold.

11. The control system of claim 9 wherein said pressures are sensed upstream of said valve.

* * * * *